INVENTOR.
FORREST O. E. SCHULTZ
BY
ATTORNEY.

INVENTOR.
FORREST O. E. SCHULTZ
BY
Irvin L. Groh
ATTORNEY.

United States Patent Office 3,002,499
Patented Oct. 3, 1961

3,002,499
DIFFERENTIAL PRESSURE SERVO-MOTOR
Forrest O. E. Schultz, Owosso, Mich., assignor to Midland-Ross Corporation, Cleveland, Ohio, a corporation of Ohio
Filed Jan. 4, 1960, Ser. No. 285
6 Claims. (Cl. 121—41)

This invention relates to differential pressure servo-motors and more particularly to servo-motors of the type used to operate the hydraulic brake systems of vehicles.

It is a general object of this invention to provide a brake servo-motor incorporating valve means affording rapid control movement in response to manual control movement.

Another object of the invention is to provide a valving arrangement for a differential pressure motor in which the number of valve parts are kept to a minimum and in which the parts used perform a plurality of functions obviating the need for additional elements such as springs and seals.

More specifically, it is an object of this invention to provide a valve means for a differential pressure motor which is made of flexible, resilient material and so arranged in the motor that it eliminates at least one spring which is normally used to seat the valve element and also eliminates the need for at least one dynamic seal which is normally used between the valve element and its housing.

Still another object of the invention is to provide a differential pressure motor in which the valve means is so arranged relative to the other parts of the motor that speed of operation is greatly increased, i.e., the valve opens to operate the motor at a faster rate than its manually movable control member.

These and other objects are attained by the present invention, various novel features of which will be apparent from the following description and from the accompanying drawings disclosing a preferred embodiment of the invention.

Referring to the drawings.

Figure 1:
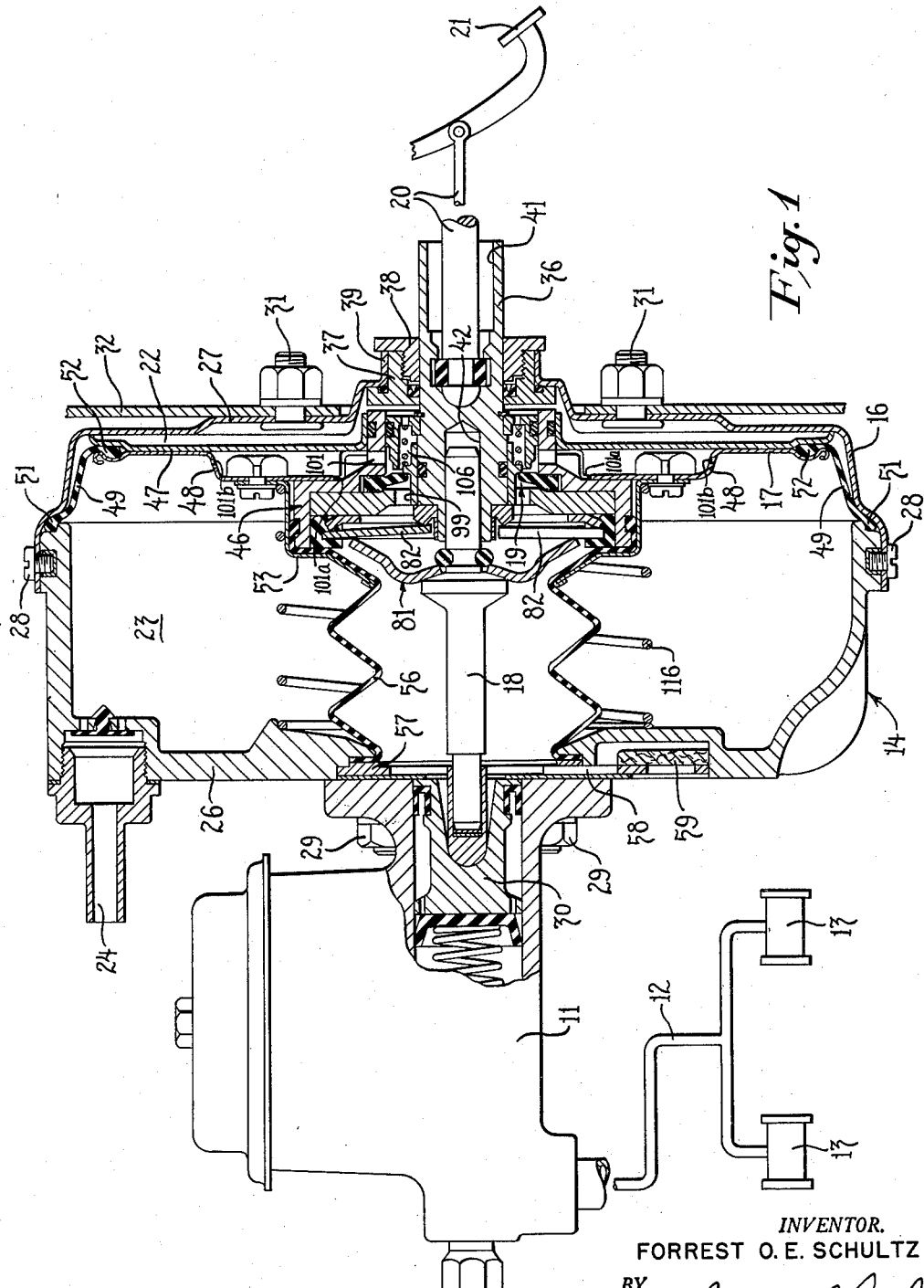
FIG. 1 is a longitudinal sectional view through a servo-motor with only a portion of a master cylinder shown in section.

The differential pressure servo-motor embodying the invention has particular utility in hydraulic brake systems of the type illustrated diagrammatically in FIG. 1. In such systems, hydraulic fluid is delivered from a master cylinder 11 through lines 12 to actuators 13 which apply the brakes at the wheels (not shown). These components are of conventional construction and their operation and use is so well known in the art that a detailed description is not required for a full understanding of the invention.

When the master cylinder 11 of such brake systems is actuated by a fluid pressure servo-motor rather than by manual force, the brake system is referred to as a power brake system.

As seen in FIG. 1, a servo-motor 14 embodying the invention includes a housing 16 in which a movable wall 17 responds to pressure differentials to move a rod 18 which actuates the master cylinder 11 mounted on the housing. The pressure differential acting on the wall 17 is under the control of a valve means 19 actuated manually through means of a link 20 connected to a brake pedal 21.

The servo-motor 14 is of the vacuum suspended type, i.e., in its brake released condition, as shown in FIG. 1, vacuum or subatmospheric pressure exists in chambers 22 and 23 formed in the housing at opposite sides of the wall 17 and the wall remains stationary. To actuate the motor, atmospheric air is admitted to the chamber 22 so that the pressure differential on the wall 17 moves it and the rod 18 to actuate the master cylinder 11. The source of vacuum pressure is provided by placing the intake manifold of an internal combustion engine (not shown) in communication with a port 24.

The housing 16 is made up of a forward housing member 26 and a rearward housing member 27 joined together by screws 28. The forward housing member 26 is provided with fastening means 29 by which the master cylinder 11 may be fastened directly to the housing 16 in position for the master cylinder piston 30 to receive the forward end of the rod 18. The rearward housing 27 is provided with studs 31 by which the housing may be connected to a portion of a vehicle, such as an engine compartment wall 32, in position to receive the link 20 from the brake operating pedal 21.

A manual control member 36 is supported for axial movement in a bearing made up of two elements 37 and 38 threaded together to grip opposed surfaces of a flange 39 formed by the rear housing member 27. The rearward end of the member 36 is provided with a bore 41 to receive the forward end of the link 20 and the forward end of member 36 is provided with a bore 42 to slidably receive the rearward end of the rod 18.

Figure 2:
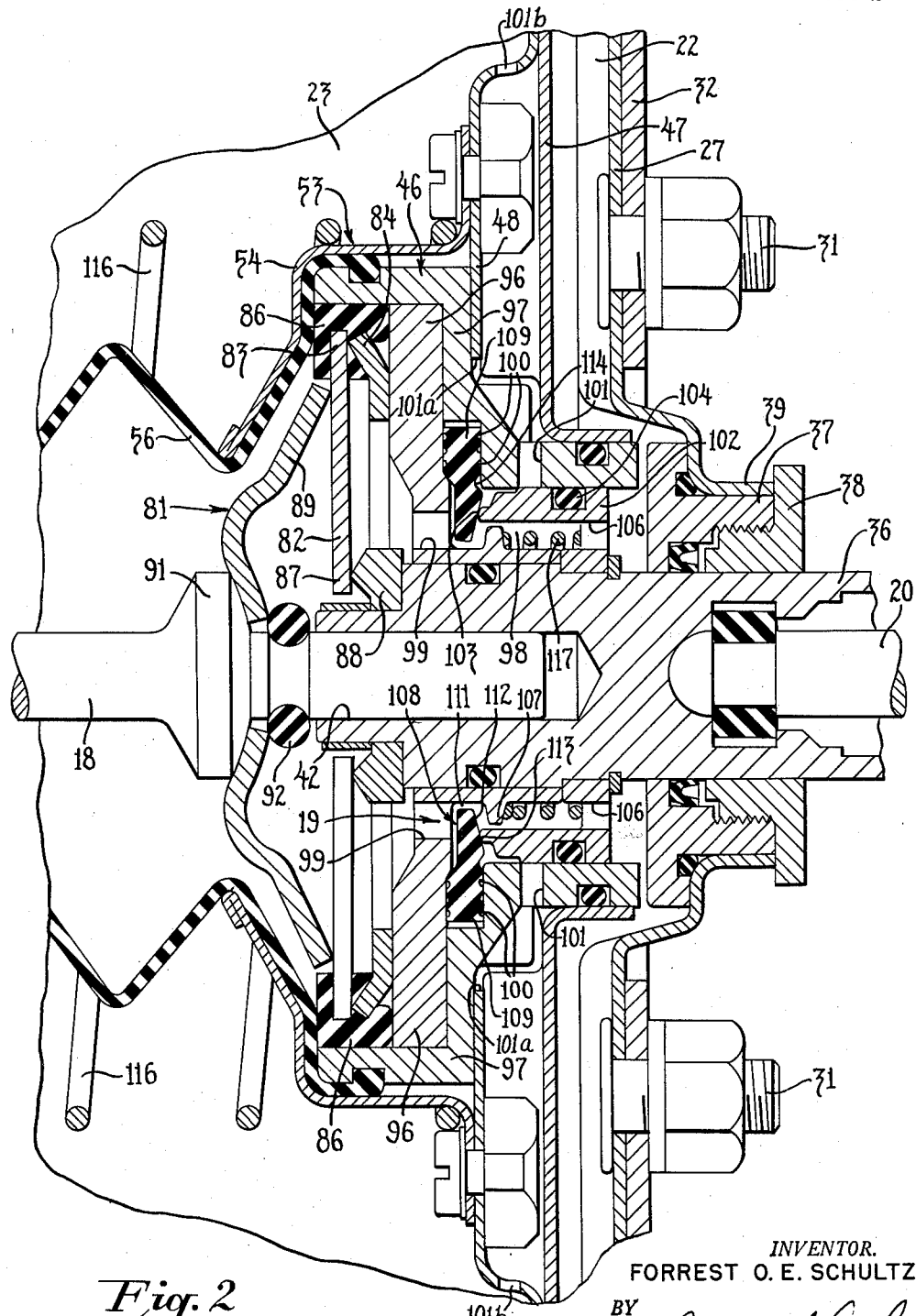
FIG. 2 is an enlarged view of a portion of the mechanism shown in FIG. 1.

The movable wall 17 includes a hub assembly 46 slidably supported on the control member 36, a pair of plates 47 and 48 and an annular diaphragm 49. The diaphragm has its outer circumferential edge 51 clamped between the housing members 26 and 27 and the inner circumferential edge 52 clamped between the plates 47 and 48 which may be fastened together by rivets or welding. As best seen in FIG. 2, the plates 47 and 48 are connected to the hub 46 by means of a clamp element 53 connected to the plate 48 and having a flange 54 coacting with a forward portion of the hub to fasten one end of a tubular bellows element 56 to the hub 46. A forward portion of the bellows element 56 is connected to the forward housing member 26 by a ring 57 (FIG. 1). The interior of the bellows 56 communicates with the atmosphere through a passage 58 and an air filter 59 and affords a source of atmospheric pressure which is under control of the valve means 19 for actuating the servo-motor.

Movement of the wall in response to differential pressure acting on it and movement of the control member is transmitted to the rod 18 through force distributing or transmitting means 81 which include a plurality of spaced, radially disposed levers 82 having their outer ends 83 abutting a ring element 84 and connected thereto by a rubber-like ring 86 vulcanized to the ends of levers 82 and ring element 84 but permitting relative movement between the parts. The ring element 84 and levers 82 are held in position relative to the wall 17 through means of the bellows 56 and the clamp element 53. The inner ends 87 of the levers 82 engage an element 88 which is made of wear-resistant material and is rigidly connected to the control member 36. Intermediate portions of the levers 82 engage a dished plate element 89 supported on the output member 18 and held between an enlarged portion 91 and a flexible O-ring retainer 92.

Manual force is transmitted to the output member 18 upon movement of the inner ends 87 to pivot the levers 82 relative to their outer ends 83 and exert a force on the plate element 89.

Powered movement of the output member 18 due to a pressure differential on the wall 17 results when wall movement causes movement of the lever ends 83 to pivot the levers 82 about their inner ends 87. This exerts a force on the plate element 89 and, consequently, on portion 91 of rod 18.

The force transmitting means 81 make it possible for the manual input force applied to the control member 36 and the force resulting from differential pressures acting on the wall 17 to be transmitted to the rod 18 which acts as an output member. Movement of the output member or rod results in actuation of the hydraulic master cylinder 11. As the hydraulic pressure from the master cylinder increases, a reaction is transmitted rearwardly through the rod 18 to pivot the levers relative to the stationary wall and impose a force on the control member 36 which is sensed at the foot pedal 21. In this manner, the operator can feel the magnitude of the brake applying force being applied by the differential pressure and the master cylinder. In other words, the greater the brake applying force, the greater the resistance at the pedal. However, the force or reaction at the pedal is directly proportional to but substantially less than the force applied to the master cylinder.

The valve means 19 which is actuated manually and controls the differential pressures acting on the movable wall 17 is incorporated in the hub 46 of the movable wall and in the manual control member 36. As best seen in FIG. 2, the hub 46 is made of two portions 96 and 97 fastened together to form an annular valve chamber 98. The valve chamber communicates through passages 99 with the interior of the tubular bellows member 56 and fluid is free to flow therebetween through the spaces between the levers 82. The valve chamber 98 also communicates with the chamber 23 located forwardly of the movable wall 17 and externally of the tubular bellows member 56 through passages 101, openings 101a and 101b in plate 48.

A collar 102 is rigidly connected to the control member 36 and forms an annular valve seat 103. The collar 102 is provided with a seal 104 which engages the outer wall of the valve chamber 98 to prevent communication between opposite sides of the collar except through port 106. A second annular valve seat 107 is formed within the chamber by the hub portion 96. Valve seats 103 and 107 are controlled by a generally annular or ring-like valve element 108 which is made of flexible, resilient material, such as rubber and is disposed to one side of both of the valve seats 103 and 107. The valve element 108 has a substantial portion of its outer circumference 109 anchored between the hub portions 96 and 97. The annular grooves 100 at opposite sides of the valve element permit compression of the resilient materials and afford a seal preventing fluid leakage between the hub portions. The edge of an enlarged, central opening or control passage 111 forms an annular seat engaging portion 112 complementary to the valve seat 107. Another annular seat engaging portion 113 is formed in slightly spaced relation to portion 112 and is adapted for engagement with the valve seat 103. The valve element 108 is also provided with a reduced cross section at 114 to provide an annular hinge for relative movement between the outer circumference 109 and the seat engaging portions 112, 113.

Under the condition shown in FIG. 1, the valve element 108 is disposed in an undeformed condition so that it engages valve seat 107 and is maintained in that position by the atmospheric pressure acting at the left of the valve element against the relatively lower vacuum pressure at the right. This prevents fluid communication between opposite sides of the valve seat 107. At the same time, valve seat 103 is spaced from the valve element 108 to permit communication between chambers 22 and 23 by way of the ports 101, between valve element 108 and valve seat 103 and through port 106.

When seat engaging portion 113 is engaged with valve seat 103 as shown in FIG. 2, the chambers 22 and 23 are isolated from each other. With the seat engaging portion 112 spaced from valve seat 107, the valve chambers 22 and 23 remain isolated from each other but chamber 22 is placed in communication with the bellows 26 through the passages 99 around the valve seat 107 and through passages 106. This admits atmospheric air from the bellows 56 to chamber 22 and causes a differential pressure to act on the wall 17 which causes movement of the latter to the right from the position shown in FIG. 1.

In a released condition of the brakes, the servo-motor parts occupy the position shown in FIG. 1, that is, the wall 17 is in its rearward position with a flange 95 on the plate 47 engaged with the housing member 27 to limit rearward movement of the wall 17. In addition, the valve element 108 is engaged with the valve seat 107 and disengaged from the valve seat 103. This permits communication between chambers 22 and 23 but isolates them from the atmosphere in the bellows 56 so that the wall 17 remains stationary.

Initial movement of the control member 36 in response to manual effort applied to the pedal 21 is effective to initiate valve operation and also to initiate hydraulic output for brake operation. As the control member moves, the valve seat 103 approaches and engages the valve element 108. This isolates the chambers 22 and 23 not only from the atmosphere in the bellows 56 but also from each other. This is the lap position of the valve in which it is in readiness for either applying or releasing the brakes. At the same time that the valve seat 103 is moving from its released position in FIG. 1 to its lap position, manual movement is transmitted through the ring 88 to the radially inner ends 87 of the levers. The wall 17 and the ring 84 remain stationary and as a consequence, the levers pivot about their radially outer ends. This movement is transmitted to the plate 89 and the rod 18 so that the latter moves to the left and begins to increase the pressure of the hydraulic fluid in the master cylinder, the lines 12 and the actuators 13. This ordinarily is sufficient to move the usual brake applying mechanism, such as the shoes into engagement with the brake drums so that any further increase in pressure is effective to apply the brakes.

Under the conditions just described, manual effort places the brake mechanism in condition for operation and the valve means in lap position. Subsequent movement of the manual control member 36 continues to apply manual effort through the levers 82 to the rod 18 and at the same time the valve element 108 is deflected about its hinge from engagement with the seat 107. This places the valve chamber 98 in communication with the interior of the bellows 56 and atmospheric air begins to enter the chamber 22. Since vacuum exists in chamber 23 which is isolated from valve chamber 63 by the engagement of the valve element 108 and valve seat 103, a differential pressure is created on the wall 17 which causes it to move to the left in the housing. Such movement is applied to the radially outer ends of the levers and causes the levers to pivot relative to their radially inner ends 87. The lever movement is transmitted to the plate 89 and consequently, to the output rod 18 to further increase the pressure in the hydraulic system to apply the brakes.

The generated hydraulic pressure acting on the rod causes a reaction to be applied to the right on the rod 18 in FIG. 1 and this is transmitted through the plate and levers to the control member 36 and consequently, to the foot pedal 21. In this manner, the operator is capable of sensing the degree of the generated hydraulic pressure and brake application, that is, the greater the hydraulic pressure, the greater the brake applying force and pedal pressure.

As the wall 17 moves to the left after unseating of the valve element from the seat 103, continued manual movement of the member 36 follows the motion of the wall and maintains the valve open. This is called the follow-up characteristic of the valve. With the valve in its applied position, the pressure in chamber 22 increases until it reaches atmospheric pressure or until the brakes are applied to a sufficient degree and movement of pedal 21 is stopped. When movement of the pedal and control member 36 stops, the wall 17 continues to move relative to the stationary valve seat 103. This permits the valve element 108 to return toward the position from which it was originally deflected. In so doing, the valve element remains engaged with valve seat 103 and the inner annular portion returns into engagement with the other valve seat 107. This is the lap position of the valve means in which chambers are isolated from each other and from the source of atmospheric pressure afforded by the bellows 56. Under such conditions, a differential pressure is maintained on the wall 17 and the brakes remain applied. An enlarged cross section of the valve element between the seat engaging portions 112 and 113 prevents deflection of the valve element 108 due to the pressure differential resulting from atmospheric pressure at the left side and vacuum pressure at the right side of the valve element.

When the pedal 21 is released, the reaction on the rod 18 acts to the right and causes movement of the control member to the right relative to the wall 17. This moves the valve seat 103 to the right relative to valve element 108 and chambers 22 and 23 are placed in communication with each other. The pressure in the chambers 22 and 23 tends to equalize and the wall 17 returns to the right due to the reaction of the rod 18 to the right and a return spring 116 disposed between the housing member 26 and the wall 17. When the wall 17 engages housing member 27, the control member is moved to the right until the ring 88 engages the hub by means of a spring 117 disposed between the valve seat 72 and collar 102. This completes the release operation and the parts occupy the position shown in FIG. 1.

The flexible, resilient valve element 108 and its relationship to the valve seats results in a unique and improved operation which gives exceptional performance to a power brake system.

One of the important considerations in a differential pressure servo-motor is that the valve controlling differential pressures must open quickly in response to manual movement so that the brakes are applied as rapidly as possible. In prior art devices, the valve element can be opened only as rapidly as its manual control member is being moved. However, in the present embodiment of the invention, the requirement of speed is rapidly achieved since movement of the control member 36 acts through the annular valve seat 103 on the valve element 108 and amplifies movement at the radially inner portion or seat engaging portion 112. In other words, upon movement to the left in FIG. 1, the seat engaging portion 112 moves at the same rate of speed as the manual control member 36 but the seat engaging portion 113 pivots about the hinge and moves at a greater speed than the manual control member 36 to increase opening movement of the valve means. Although the distances involved are relatively small and the time element must be measured in fractions of a second, the brakes must be applied very rapidly to be completely effective and even hundredths of a second are extremely significant.

It will also be noted that the lap range of the valve means is extremely small when compared to another type of valve arrangement, that is, as soon as valve seat 103 engages valve element 108, valve deflection begins to disengage seat 107 from the valve element. Consequently, a transition from a brake released condition to a brake applied condition is rapidly achieved.

Not only does the valve element permit opening movement at a more rapid rate than achieved with other types of servo-motors, but it also eliminates a dynamic seal which in prior art devices is required between the movable valve element and the walls of the valve chamber. Such dynamic seals add a variable and unpredictable friction problem to the device. In the present embodiment of the invention, the grooves 110 act as a static seal which replaces the usual dynamic seal and the problems of friction are avoided.

The present valve element 108 eliminates the need for accurate return springs since the natural resiliency of the valve element causes it to return to its initial position after it has been deflected to an operating position.

It should be understood that it is not intended to limit the invention to the above described forms and details, and that the invention includes such other forms and modifications as are embraced by the scope of the appended claims:

I claim:

1. A differential pressure servo-motor comprising a housing having a movable wall therein forming a low pressure chamber in constant communication with a source of vacuum and a variable pressure chamber at opposite sides of said wall, a manually movable input member, a hydraulic master cylinder and piston means operatively connected to said wall and said input member for actuation thereby, a source of atmospheric pressure, valve means controlling communication between said chambers to inactivate said motor and between said atmospheric source and said variable pressure chamber to activate said motor, said valve means comprising a first seat element formed by said wall, a second seat member formed by said input member, a flexible, resilient valve element having a disk shape and having its outer circumference fixed to said wall, said element presenting a control passage therethrough, said valve element normally being engaged with said first seat member and disengaged from said second seat member to maintain said chambers in communication with each other and isolated from said atmospheric source, said second seat member being manually movable in a first stage relative to said wall and at a predetermined rate into engagement with said valve element to isolate said chambers from each other, said second seat member being movable in a second stage to deflect a portion of said valve element adjacent said control passage out of engagement with said first seat at a relatively faster rate than said predetermined rate to rapidly admit atmospheric pressure to said variable pressure chamber for moving said wall.

2. In a fluid pressure control means for a fluid pressure motor having a housing and a pressure responsive wall dividing said housing into a constant pressure chamber and a variable volume chamber, a manual control member having a portion disposed in said housing, a first valve seat formed by said movable wall and disposed between said variable pressure chamber and a source of atmospheric pressure, a second valve seat formed on said manual control member and disposed concentrically with said first valve seat between said chambers, a flexible, resilient valve element disposed concentrically with said valve seats and manual control member, said valve element having its outer edge anchored to said wall and forming a central aperture, said valve element normally being positioned with a portion adjacent said aperture in engagement with said first valve seat to isolate said chambers from said atmospheric source, said valve element being maintained in such engagement by differential pressure in said source of atmospheric pressure and in said chambers, said second valve seat being movable with said manually movable member into engagement with said valve element to isolate said chambers from each other and to deflect said valve element relative to its outer edge from engagement with said first valve seat to admit atmospheric air through said aperture to said variable pressure chamber for creating a pressure differential acting on said wall to move the latter.

3. A servo-motor adapted to actuate a hydraulic master cylinder of a brake system comprising a housing, a movable wall in said housing forming a constant pressure chamber at one side and a variable pressure chamber at the other side, a manually movable control member slidable in said wall between predetermined limits, a first valve seat formed by said wall between a source of pressure and said chambers, a second valve seat formed by said control member between said chambers, a flexible, resilient valve element disposed transversely of said control member and at one side of said valve seats to engage the latter at an inner annular portion and an intermediate annular portion, respectively, said valve element having an outer annular portion fixed to said wall and another annular portion of reduced cross section affording a hinge for deflection of said inner and intermediate annular portions relative to said outer annular portion, said second valve seat being movable with said control member to engage said valve element at said intermediate annular portion and deflect said inner annular portion from said first valve seat at a rate faster than the rate of movement of said second valve seat to rapidly admit fluid from said source to said variable pressure chamber to create a pressure differential on said wall effective to move the latter.

4. In valve means for controlling a fluid pressure servo-motor, a hub member presenting an annular valve chamber, a first valve seat projecting radially from an inner wall of said chamber, a manually movable member slidably supported in said hub and having a portion slidably engaged with an outer wall of said valve chamber, said manually movable member presenting a second valve seat movable in a path radially outward from said first valve seat, a flexible, resilient valve closure element presenting an aperture freely receiving said manually movable member, said valve closure element being secured in fixed, sealing engagement with said outer wall of said chamber, said valve element having an inner annular portion adjacent said opening adapted to engage said first valve seat and an outer annular portion adapted to engage said second valve seat, said valve closure element normally being engaged with said first valve seat to define a closed condition of said valve means, said second valve seat engaging said outer annular portion upon movement of said manual member to deflect said valve closure element and move said inner annular portion from said first valve seat at a rate greater than that of said manually movable member to rapidly achieve an opened condition of said valve means.

5. For use with a differential pressure servo-motor having a wall forming a constant pressure chamber and a variable pressure chamber at opposite sides thereof, said wall being movable upon admission of pressure from a source of pressure to said variable pressure chamber, valve means comprising an annular valve chamber formed in said wall, a first valve seat formed integrally with an inner portion of said valve chamber, a flexible, resilient valve element having an outer edge anchored to an outer portion of said valve chamber and an inner edge normally engaged with said first valve seat to isolate said valve chamber from said source, a second valve seat manually movable relative to said first valve seat and engageable with said valve element at a point intermediate said inner and outer edges to isolate said constant and variable pressure chambers from each other and deflect said inner edge from engagement with said first valve seat at a rate greater than the rate of movement of said second valve seat to place said variable pressure chamber and said source in communication with each other.

6. In a fluid pressure control means for a fluid pressure motor having a housing and a pressure responsive wall dividing said housing into a constant pressure chamber and a variable volume chamber, a manual control member having a portion disposed in said housing, a first valve seat formed by said movable wall and disposed between said variable pressure chamber and a source of atmospheric pressure, a second valve seat formed on said manual control member and disposed concentrically with said first valve seat between said chambers, a flexible, resilient valve element disposed concentrically with said valve seats and manual control member and having concentrically disposed valve seat engaging portions, said valve element having its outer edge anchored to said wall and forming a central aperture, said valve element normally being positioned with a portion adjacent said aperture in engagement with said first valve seat to isolate said chambers from said atmospheric source, said valve element being maintained in sealing engagement with said first valve seat by differential pressure in said source of atmospheric pressure and in said chambers, said second valve seat being movable with said manually movable member in a first range into engagement with said valve element while the latter is engaged with said first valve seat to isolate said chambers from each other, said valve element having a relatively thick cross section between said valve seat engaging portions to resist deflection of said valve element due to differential pressure when said valve element is in engagement with both of said valve seats, and said second valve seat being movable in a second range to deflect said valve element relative to its outer edge from engagement with said first valve seat to admit atmospheric air through said aperture to said variable pressure chamber for creating a pressure differential on said wall to move the latter.

References Cited in the file of this patent
UNITED STATES PATENTS

| | | |
|---|---|---|
| 2,826,041 | Rike | Mar. 11, 1958 |
| 2,842,101 | Price | July 8, 1958 |
| 2,861,427 | Whitten | Nov. 25, 1958 |